United States Patent
De Vries et al.

(10) Patent No.: US 6,318,512 B1
(45) Date of Patent: Nov. 20, 2001

(54) ACTUATOR HAVING PROTECTED SCREW MECHANISM, AND BRAKE CALLIPER COMPRISING SUCH ACTUATOR

(75) Inventors: Alexander Jan Carel De Vries, Tiel; Armin Herbert Emil August Olschewski; Hendrikus Jan Kapaan, both of Nieuwegein, all of (NL); Roland Haas, Hofheim (DE)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/446,675

(22) PCT Filed: Jun. 29, 1998

(86) PCT No.: PCT/NL98/00374

§ 371 Date: Dec. 27, 1999

§ 102(e) Date: Dec. 27, 1999

(87) PCT Pub. No.: WO99/02884

PCT Pub. Date: Jan. 21, 1999

(30) Foreign Application Priority Data

Jul. 10, 1997 (NL) .................................................. 1006544

(51) Int. Cl.$^7$ .................................................. F16D 55/08
(52) U.S. Cl. .................................... 188/72.1; 188/162
(58) Field of Search .................... 188/72.1, 162, 188/158, 72.3, 196 V, 71.9, 72.6, 72.8, 156, 161, 163, 196 A, 72.7, 73.39, 73.38

(56) References Cited

U.S. PATENT DOCUMENTS

| | | | |
|---|---|---|---|
| 3,887,044 | * | 6/1975 | Burgdorf et al. ................. 188/73.38 |
| 4,222,463 | * | 9/1980 | Domes et al. ...................... 188/72.3 |
| 5,829,557 | * | 11/1998 | Halasy-Wimmer et al. ........ 188/162 |
| 5,931,126 | * | 8/1999 | Kingston et al. .................... 188/162 |
| 6,000,507 | * | 12/1999 | Bohm et al. .......................... 188/158 |
| 6,073,732 | * | 6/2000 | Angerfors ........................... 188/71.9 |

FOREIGN PATENT DOCUMENTS

| | | |
|---|---|---|
| 1 390 757 | 1/1965 | (FR) . |
| WO 96/03301 | 7/1995 | (WO) . |
| WO 97/30294 | 8/1997 | (WO) . |

* cited by examiner

*Primary Examiner*—Douglas C. Butler
*Assistant Examiner*—Melanie Torres
(74) *Attorney, Agent, or Firm*—Oliff & Berridge PLC

(57) ABSTRACT

An electric actuator (13) comprises a housing (17) which contains a screw mechanism (11) and an electric motor (5) which is driveably connected to the screw mechanism (11) which provides a linear movement in response to a rotational movement of the electric motor (5), said screw mechanism (11) comprising a screw (12) and a nut (33) one of which is supported rotatably with respect to the housing (7) by means of an angular contact ball bearing (31), said screw (12) by means of an intermediate coupling element (18) engaging an actuating member (16) for transferring axial forces. The intermediate coupling element (18) engages the screw (12) by means of an axial connection (53, 54) which allows radial movements.

21 Claims, 2 Drawing Sheets

US 6,318,512 B1

ACTUATOR HAVING PROTECTED SCREW MECHANISM, AND BRAKE CALLIPER COMPRISING SUCH ACTUATOR

BACKGROUND OF THE INVENTION

The invention is related to an actuator, comprising a housing which contains a screw mechanism and an electric motor which is driveably connected to the screw mechanism which provides a linear movement in response to a rotational movement of the electric motor, said screw mechanism comprising a screw and a nut one of which is supported rotatably with respect to the housing by means of an angular contact ball bearing, said screw by means of an intermediate coupling element engaging an actuating member, for transferring axial forces, said actuating member comprising a housing which contains a screw mechanism and an electric motor which is driveably connected to the screw mechanism which provides a linear movement in response to a rotational movement of the electric motor, said screw mechanism comprising a screw and a nut one of which is supported rotatably with respect to the housing by means of an angular contact ball bearing, said screw by means of an intermediate coupling element engaging an actuating member for transferring axial forces, said intermediate coupling element engaging the screw by means of an axial connection which allows radial movements.

Such actuator is known from WO-A-9603301. This prior art actuator, which is part of a brake calliper, has a screw mechanism which by means of a pivotal intermediate coupling element is connected to a brake pad. Upon actuation of the electric motor which drives said actuator, the brake pad is pressed against a brake disc. As a result, the intermediate coupling element will be loaded and displaced somewhat in transverse direction, which transverse displacements could hamper and destroy the screw mechanism. In an attempt to alleviate this problem, an intermediate coupling element has been applied which is bar-shaped, and which at both ends is pivotally engaging the brake pad and the screw of the screw mechanism.

Although such coupling element eliminates the transverse loads as occur in a stiff connection, still problems may arise. In an oblique position of the bar-shaped coupling element, the actuating forces have a transverse component which leads to an unfavourable loading in the screw mechanism.

The object of the invention is to provide a solution for this problem. This object is achieved in that the intermediate coupling element and the screw engage each other by means of essentially radial surfaces, which surfaces are mutually radially displaceable.

Even in case the brake pad, as a result of engaging the brake disc, would be loaded and displaced somewhat in transverse direction, the screw mechanism will only be loaded in axial direction. This favourable loading results from the fact that the intermediate element and the screw are uncoupled in radial direction (within certain boundaries). The intermediate coupling element and the screw engage each other by means of essentially radial surfaces, which surfaces are mutually radially slidable; also, the mutually radially displaceability is basically governed by frictional engagement.

A very stable embodiment is obtained in case the screw has a ring shaped abutment surface engaging a pressure intermediate coupling element having a corresponding abutment surface, which abutment surfaces are slidably with respect to each other.

In case a compression member is provided for pressing the abutment surfaces onto each other, a rattle-free construction is obtained. Said compression member acts between the pressure intermediate coupling and a cap which is connected to the screw. Preferably, the compression member is a conical washer (Belleville washer).

The cap has an aperture for the actuating member, which rests against the pressure intermediate coupling element, and is sealed with respect to the actuating member.

The actuator according to the invention is in particular fit for application of a roller screw spindle.

SUMMARY OF THE INVENTION

Furthermore, the invention is related to a brake calliper for an electrically actuatable disc brake, comprising a claw piece with two opposite brake pads and an electric actuator as described before, said actuator comprising an electric motor and a screw mechanism which is driveably connected to the electric motor for providing a linear movement in response to a rotational movement of the electric motor, said screw mechanism comprising a screw and a nut on of which is supported rotatably with respect to the housing by means of an angular contact ball bearing, said screw by means of an intermediate coupling element engaging an actuating member for transferring axial forces, said actuating member comprising a housing which contains a screw mechanism and an electric motor which is driveably connected to the screw mechanism which provides a linear movement in response to a rotational movement of the electric motor, said screw mechanism comprising a screw and a nut one of which is supported rotatably with respect to the housing by means of an angular contact ball bearing, said screw by means of an intermediate coupling element engaging an actuating member for transferring axial forces, said intermediate coupling element engaging the screw by means of an axial connection which allows radial movements. According to the invention, the intermediate coupling element and the screw engage each other by means of essentially radial surfaces, which surfaces are mutually radially displaceable.

The invention will further be described with relation to an example of a brake calliper shown in the figures.

DETAILED DESCRIPTION OF PREFERRED EMBODIMENTS

Figure 1:
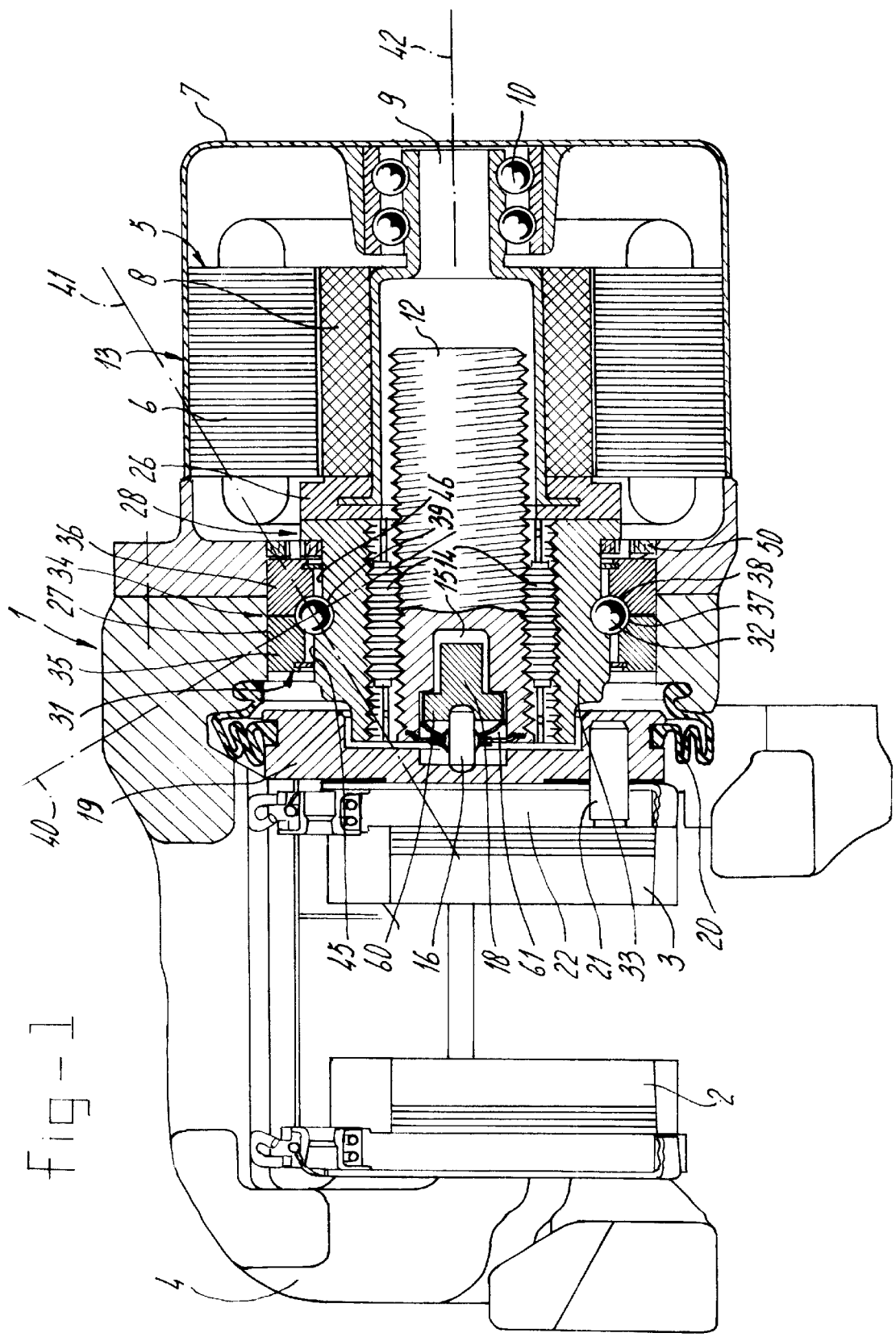
FIG. 1 shows a brake calliper according to the invention.

The brake calliper shown in FIG. 1 has a claw piece 1, which in the usual way comprises two brake pads 2, 3. Brake pad 2 is connected to flange 4 of the claw piece 1; by means of support 22, brake pad 3 is connected to an electric actuator, indicated in its entirety with 13.

The electric actuator 13 comprises an electric motor 5, the stator 6 of which is connected to housing part 7 of the claw piece 1.

The rotational part 8 of the electric motor 5 is connected to a shaft piece 9, which by means of bearing 10 is rotatably supported in the housing portion 7 of claw piece 1.

Figure 2:
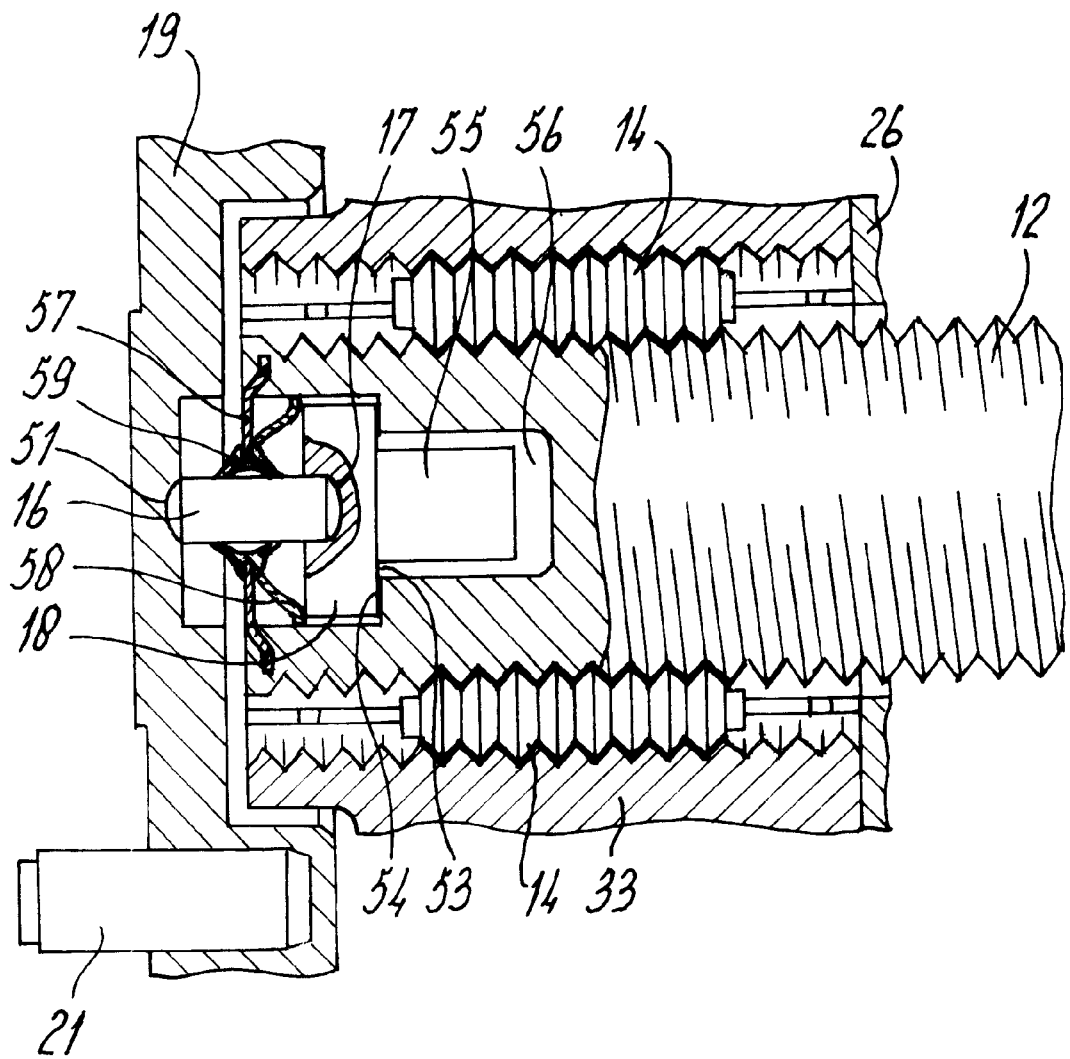
FIG. 2 shows an enlarged detail.

The actuator 4 furthermore comprises a screw mechanism 11, which comprises inter alia a partly hollow screw 12 (as shown in FIG. 2) and a nut member 33. The nut member 33 and the screw member 12 co-operate by means of rollers 14, and constitute a roller spindle, which is known per se.

The rotational part 8 of the electric motor 5 is driveably connected to the nut member 33, such that upon rotation thereof the screw member 12 is displaced in axial direction via the rollers 14.

The screw member 12, the hollow space of which is indicated by 15, contains an intermediate coupling element 18 and an actuating member 16 which extends from said intermediate coupling element 18, and which protrudes from the open end of the screw member 12.

At both ends, the actuating member 16 is convex, and engages correspondingly concave depressions 17, 51 in the intermediate coupling element 18 respectively the actuating head 19.

The intermediate coupling element 18 has a radial ring shaped abutment face 53, which abuts a radial ring shaped abutment face 54 of screw member 12. Furthermore, the intermediate coupling element 18 has a protrusion 55, protruding in depression 56 of screw member 12. Ring part 60 of intermediate coupling element 18 has a smaller diameter than hollow part 61, of the screw member 12. Thus, the intermediate coupling element 18 is radially movable somewhat within said hollow space 15, 61, whereby radial loadings on screw member 12 due to displacements of brake pad 3 are avoided.

Actuation member 16 protrudes through a hole in cap 57; said cap 57 is sealed by means of seal 59. Furthermore, by means of Belleville washer 58, the intermediate coupling element 18 is held clamped against screw member 12.

At its protruding end, the actuating member comprises an actuating head 19, which rests against support 22 of brake pad 3. This actuating head is sealed with respect to the housing piece 7 of claw piece 1 by means of a bellows 20, which is known per se. As mentioned, between the brake pad 3 and the actuating head 19, there is a support member 22, which by means of pin 21 is rotatably fixed with respect to said actuating head 19.

As is usual, the brake pads 2, 3 have some play in a direction transverse with respect to the axis of screw member 12. Thus, upon pressing the brake pads 2, 3 to a brake disc (not shown), said pads will exhibit some transverse movements with respect to the screw member 12. Due to the fact that the actuating member 16 is not rigidly connected to the screw member 12, the latter one will not be exposed to said transverse movements or loadings. Instead, the intermediate coupling element 18 will be shifted radially somewhat within the hollow space 15 of hollow screw member 12, which movement is possible due to the radial play which exists between the intermediate coupling element 18 and the internal wall of the hollow space 15.

According to the invention, a four-point contact ball bearing 31 has been applied. Said bearing may have a split inner ring or a split outer ring. This four-point contact ball bearing 31 comprises one series of rolling balls 32, an inner ring 33 which forms a unity with the nut member of screw mechanism 11, and an outer ring 34 comprising two outer ring halves 35, 36. These outer ring halves 35, 36 together define a raceway 37, 38; the inner ring 33 defines a raceway 39.

The raceways 37–39 are formed in such a way that four contact points are obtained, comprising two pairs which each define a working line 40, 41.

According to the invention, the raceways 37–39 have been formed in such a way that the working lines 40–41 intersect the axis of the bearing 31 under mutually different angles. Working line 40 intersects the axis 42 under a greater angle than working line 41. Thus, four-point contact ball bearing 31 according to the invention is in particular fit for taking the axial loads exerted by the brake pads 2, 3 when these are pressed onto the brake disc (not shown).

The particular orientation of the working lines 40, 41 is obtained by an oblique orientation of the raceways 37–39. This orientation results from the relatively large diameter of the inner surface or land 43 of outer bearing ring half 35, and the smaller inner diameter of the inner surface or land 44 of outer ring half 36.

Also, the outer surface or land 45 of the inner ring 34 has a diameter which is larger than the outer surface or land 46 thereof.

The four-point contact ball bearing 31 furthermore comprises a sensor 50, the parts of which are connected to outer ring halve 36 and to inner ring 33. This sensor may serve basic functions such as giving information concerning wear compensation, maintenance indication, broke force feedback (ABS), traction control and for vehicle dynamic functions, and anti-theft purposes.

What is claimed is:

1. Electric actuator (13), comprising a housing (7) which contains a screw mechanism (11) and an electric motor (5) which is driveably connected to the screw mechanism (11) which provides a linear movement in response to a rotational movement of the electric motor (5), said screw mechanism (11) comprising a screw (12) and a nut (33) one of which is supported rotatably with respect to the housing (7) by means of an angular contact ball bearing (31), said screw (12) by means of an intermediate coupling element (18) engaging an actuating member (16) for transferring axial forces, said intermediate coupling element (18) engaging the screw (12) by means of an axial connection (53, 54) which allows radial movements, the intermediate coupling element (18) and the screw (12) engage each other by means of essentially radial surfaces (53, 54), which surfaces are mutually radially displaceable, characterized in that the actuating member (16) and the intermediate coupling element (18) engage each other through corresponding convex and concave surfaces.

2. Actuator according to claim 1, wherein the essentially radial surfaces are mutually radially slidable.

3. Actuator according to claim 1, wherein the mutually radial displaceability is basically governed by frictional engagement.

4. Actuator according to claim 1, wherein the screw (12) has a ring shaped first abutment surface (54) engaging the intermediate coupling element (18) having a corresponding second abutment surface (53), which abuts the first radial surface (54) wherein each abutment surface is slidable with respect to each other.

5. Actuator according to claim 4, wherein the ring shaped abutment surface (54) of the screw (12) encloses a central depression (56), and the pressure intermediate coupling element (18) has a protrusion (55) which projects into said depression (56).

6. Actuator according to claim 4, wherein a compression member (58) is provided for pressing the abutment surfaces (53, 54) onto each other.

7. Actuator according to claim 6, wherein the compression member (58) acts between the pressure intermediate coupling element (18) and a cap (57) which is connected to the screw (12).

8. Actuator according to claim 7, wherein the compression member is a conical washer (58).

9. Actuator according to claim 7, wherein the cap (57) has an aperture for the actuating member (16), which rests against the pressure intermediate coupling element.

10. Actuator according to claim 9, wherein the cap (57) is sealed (59) with respect to the actuating member (16).

11. Actuator according to claim 1, wherein the screw mechanism (11) comprises a roller screw spindle.

12. Brake calliper for an electrically actuatable disc brake, comprising a claw piece (4) with two opposite brake pads (2, 3) and an electric actuator (13) according to claim 1, said actuator (13) comprising a housing (7) and an electric motor (5) and a screw mechanism (11) which is driveably connected to the electric motor (5) for providing a linear movement in response to a rotational movement of the electric motor (5), said screw mechanism (11) comprising a screw (12) and a nut (33) one of which is supported rotatably with respect to the housing (7) by means of an angular contact ball bearing (31), said screw (12) by means of an intermediate coupling element (18) engaging an actuating member (16) for transferring axial forces, said intermediate coupling element (18) engaging the screw (12) by means of an axial connection (53, 54) which allows radial movements, the intermediate coupling element (18) and the screw (12) engage each other by means of essentially radial surfaces (53, 54), which surfaces are mutually radially displaceable, characterized in that the actuating member (10) and the intermediate coupling element 18 engage each other through corresponding convex and concave surfaces.

13. Brake calliper according to claim 12, wherein the intermediate coupling element (18) and the screw (12) engage each other by means of essentially radial surfaces (53, 54), which surfaces are mutually radially displaceable.

14. Brake calliper according to claim 13, wherein the screw (12) has a ring shaped abutment surface (54) engaging a pressure intermediate coupling element (18) having a corresponding abutment surface (53), which abutment surfaces (53, 54) are slidably with respect to each other.

15. Brake calliper according to claim 14, wherein the ring shaped abutment surface (54) of the screw (12) encloses a central depression (56), and the pressure intermediate coupling element (18) has a protrusion (55) which projects into said depression (56).

16. Brake calliper according to claim 15, wherein a compression member (58) is provided for pressing the abutment surfaces (53, 54) onto each other.

17. Brake calliper according to claim 16, wherein the compression member (58) acts between the pressure intermediate coupling element (18) and a cap (57) which is connected to the screw.

18. Brake calliper according to claim 17, wherein the compression member is a conical washer (58).

19. Brake calliper according to claim 18, wherein the cap (57) has an aperture for the actuating member (16), which rests against the pressure intermediate coupling element (18).

20. Brake calliper according to claim 19, wherein the cap (57) is sealed (59) with respect to the actuating member (16).

21. Brake calliper according to claim 20, wherein the screw mechanism (11) comprises a roller screw spindle.

* * * * *